No. 633,076. Patented Sept. 12, 1899.
C. T. CONNOR, P. J. ZIEGLER & C. J. W. BRELAND.
AXLE OILER.
(Application filed May 3, 1899.)
(No Model.) 2 Sheets—Sheet 2.
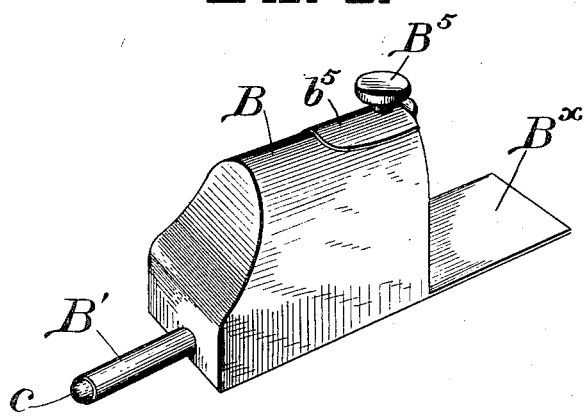
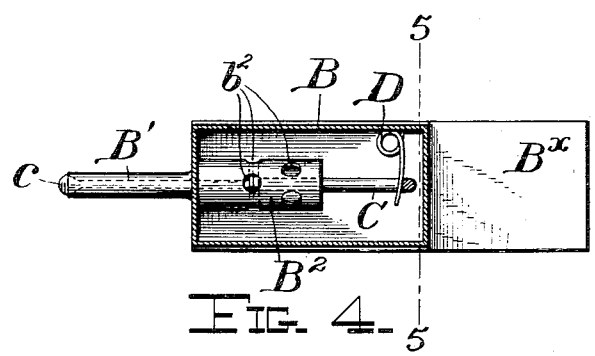
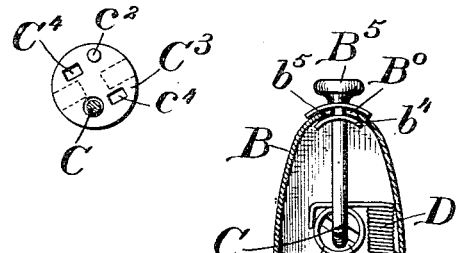
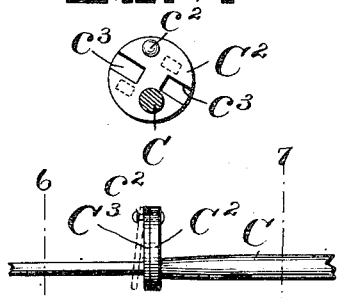
Witnesses
Percy C. Bowen
John Chalmers Wilson
Inventors
C. T. Connor,
P. J. Ziegler &
C. J. W. Breland,
by Wilkinson & Fisher
Attorneys

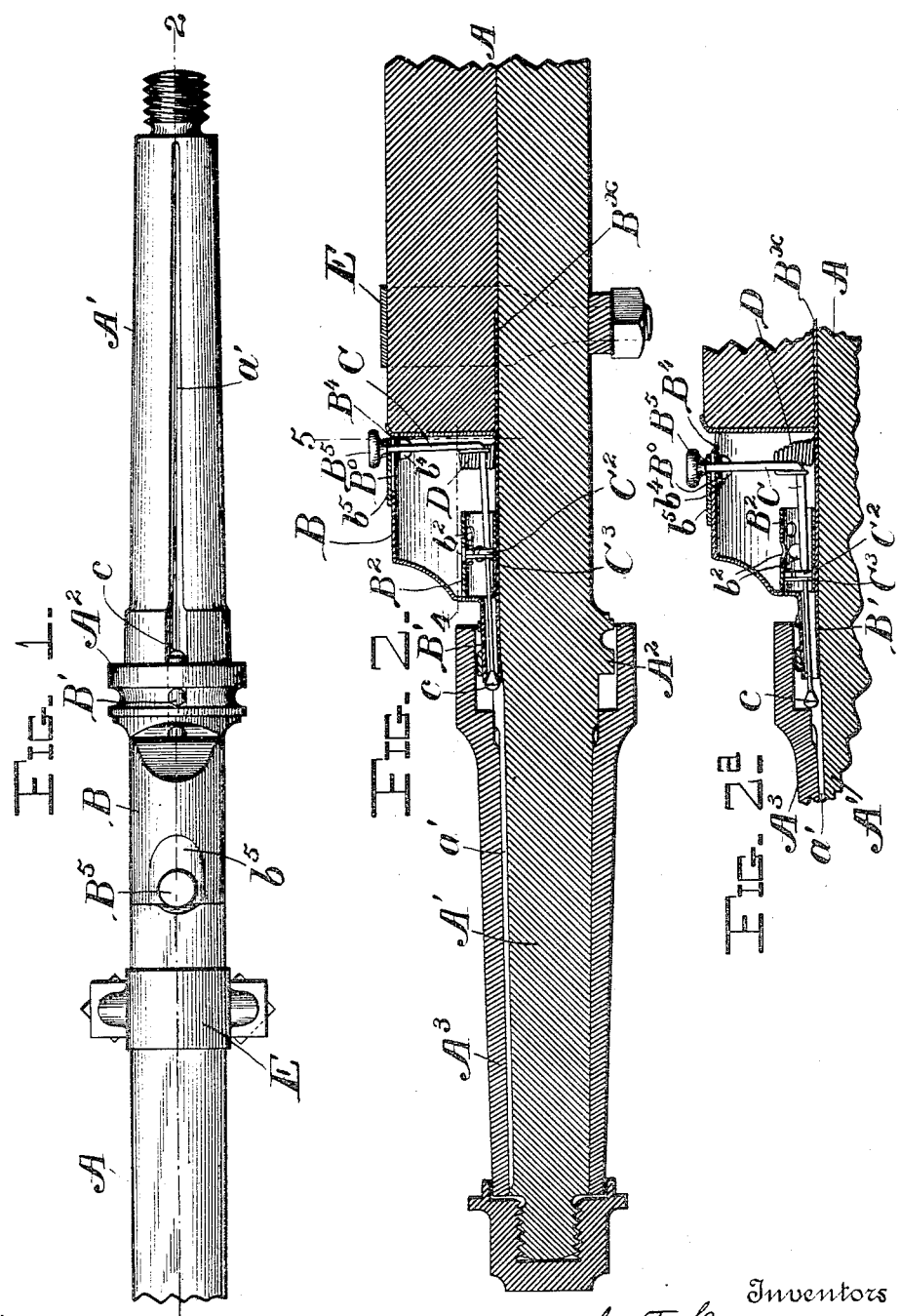

UNITED STATES PATENT OFFICE.

CHARLES T. CONNOR, PAUL J. ZIEGLER, AND CHARLES J. W. BRELAND, OF ALLENDALE, SOUTH CAROLINA.

AXLE-OILER.

SPECIFICATION forming part of Letters Patent No. 633,076, dated September 12, 1899.

Application filed May 3, 1899. Serial No. 715,440. (No model.)

*To all whom it may concern:*

Be it known that we, CHARLES T. CONNOR, PAUL J. ZIEGLER, and CHARLES J. W. BRELAND, citizens of the United States, residing at Allendale, in the county of Barnwell and State of South Carolina, have invented certain new and useful Improvements in Axle-Oilers; and we do hereby declare the following to be a full, clear, and exact description of the invention, such as will enable others skilled in the art to which it appertains to make and use the same.

Our invention relates to improvements in axle-oilers, and has for its object the providing of a simple means whereby the axle-spindles of buggies, carriages, wagons, and other vehicles may be readily oiled without the necessity of removing the wheel or unscrewing the axle-nut.

Besides its simplicity our said invention possesses the great advantage of being readily applicable to any of the wagon, carriage, buggy, or other vehicle spindles and axles now in common use.

Besides being applicable to buggies, wagons, carriages, and other vehicles our said invention may be used in practically all cases where the lubrication of a bearing or journal is required.

In order that the said invention may be more thoroughly understood, the same will be described with reference to the accompanying drawings, in which—

Figure 1 is a top plan view of a portion of a buggy or wagon axle with spindle and showing our improved oiler in position. Fig. 2 represents a section taken along the line 2 2 of Fig. 1 and showing the axle-box and nut on the spindle. Fig. 2$^a$ is a fragmentary central sectional view of the oiler and axle, showing the valve of the oiler in its open position. Fig. 3 is a perspective view of our improved oiler, showing it detached from the axle. Fig. 4 is a section taken on the line 4 4 in Fig. 2. Fig. 5 is a section taken on the line 5 5 in Fig. 4. Fig. 6 is a section taken on the line 6 6 in Fig. 8, looking to the right. Fig. 7 is a section taken on the line 7 7 in Fig. 8, looking to the left; and Fig. 8 is a detail view, in side elevation, of the disks constituting the oil-feeding piston.

A represents the axle, having the spindle A' provided with longitudinal groove $a'$ for the reception of the oil. At the shoulder of the spindle A' is a boss $A^2$ of the common form, and this boss is provided with an opening therethrough which forms a continuation of the groove in the spindle. B represents an oil-box which is fitted upon and secured to the axle adjacent to the said boss $A^2$, and this oil-box has a tubular outlet neck or spout B', which extends through the opening in the boss $A^2$, as seen most clearly in Figs. 2 and $2^a$. Within the box B and inclosing the inner opening of the tubular spout B' is a cylindrical casing $B^2$, the inner end of which is entirely open, the outer end of which communicates with the spout B', and in the walls of which are formed one or more openings $b^2$.

C represents a bent rod which has a vertical portion extending through a slot $B^0$ in the upper side of the box B and has a horizontal portion which extends through the said box into and through the spout B' and has formed upon its lower end an enlargement $c$, constituting a valve, arranged to close the outlet of the spout B' when the rod is drawn inwardly to a sufficient extent to bring the said enlargement into contact with the outlet-opening.

D represents a coil-spring fixed in the rear of the bottom of the box B and connected to the bent rod C, so as to exert a pull thereon tending to close the outlet-valve.

$C^2$ represents a disk which incloses and is rigidly mounted upon the horizontal portion of the rod C and is arranged to move within the cylindrical casing $B^2$ as a piston within a cylinder. $C^3$ represents another disk provided with an opening therethrough which allows it to move freely upon the said rod, the said disk $C^3$ being loosely connected to the disk $C^2$ by means of a rivet $c^2$, as seen in Figs. 6, 7, and 8. The rigid disk $C^2$ is provided with openings $c^3$, which allow passage of oil past the disk, and the loose disk $C^3$ is provided with openings $c^4$, also arranged to admit passage of oil; but the openings in the latter disk do not register with the openings in the former, so that when the two disks lie flat against each other the openings through both are closed. When, however, the rod C is so moved as to draw the disks through the cylinder B² backward, the friction of the loose disk against the sides of the cylinder will cause the said disk to swing away from the rigid disk somewhat, as indicated by dotted lines in Fig. 8, thus allowing the passage of oil through the openings in the said disks. The object of these disks is to cause the oil to be fed intermittently to the spout B' in small quantities, and this object will be accomplished, as is readily understood, by this arrangement of the disks, which form a closed piston as the valve is pushed forward to its open position for ejecting a portion of the oil, while they will act as a valve upon their return during the movement of the rod to the closed position of the outlet-valve. It will also be seen that the delivery of a portion of the oil will be insured even though it may be congealed somewhat, as would be likely to occur in cold weather.

Oil is supplied to the box B as needed through the opening B⁴, and this opening and the slot B⁰ are closed by means of the curved plates $b^4$ and $b^5$, rigidly attached to the vertical portion of the rod C and arranged to move closely over the inner and outer surfaces, respectively, of the upper wall of the box B, as shown in Figs. 2, 2ᵃ, and 5.

The box B has a rearward extension Bˣ at its bottom, which is clamped upon the axle by means of the clip E, and thus, with the assistance of the spout B', passing through the boss A² on the axle, holds the box firmly in position.

The operation of the device is as follows: The box having been filled with oil through the opening B⁴, as above described, and being desired to lubricate the axle without moving the wheel therefrom, the rod C is pushed forward—that is, toward the outer end of the axle—by means of the knob B⁵, provided for this purpose, which displaces the valve c from the outlet end of the spout B', and at the same time the piston, composed of the disks C² and $c^3$, forces a small quantity of the oil through the outlet-spout into the groove a' in the spindle, wherein the oil is distributed along the spindle and is communicated to the boxing A³ by rotation of the wheel, as is well known. When the knob B⁵ is released, the valve c closes the outlet of the spout B' and the flow of oil is stopped. During the return of the rod C the loose disk C³ will swing away from the rigid disk C² and a portion of oil will flow through the openings in the said disk into the outlet-spout B', ready to be discharged when lubrication of the spindle again becomes necessary.

Having thus described our invention, what we claim, and desire to secure by Letters Patent of the United States, is—

1. In an axle-oiler, the combination with an oil-box having inlet and outlet openings; and a spout fitting over the outlet-opening; of a bent rod or stem having one end extending through the wall of the oil-box for manipulation by hand, and having its other end extending through the outlet-opening and said spout; a valve on the latter end of said rod or stem arranged to close the opening through said spout; and a spring acting upon said rod to close said valve, substantially as described.

2. In an axle-oiler, the combination with an oil-box having inlet and outlet openings; and a spout fitting over the outlet-opening; of a bent rod or stem having one end extending through the wall of the box for manipulation by hand, and having its other end extending through the outlet-opening and said spout; sliding plates on said rod arranged to close the inlet-opening in the wall of said box; a valve on the said rod arranged to close the opening through said spout; and a spring acting upon said rod to close said valve; substantially as described.

3. In an axle-oiler, the combination with an oil-box having inlet and outlet openings; a spout fitting over the outlet-opening without said box; and a cylindrical casing surrounding the outlet-opening within said box; of a rod extending from within said box through the said casing and said spout; a valve on said rod arranged to close said spout; a perforated piston on said rod working in said casing; and means for allowing the manipulating of said rod to operate said valve, substantially as described.

4. In an axle-oiler, the combination with an oil-box having an outlet-opening; a delivery-spout fitting over said outlet-opening without the box, and a perforated cylindrical casing surrounding said outlet-opening within said box; of a rod or stem extending through the said cylindrical casing and through the outlet-opening and said spout; a piston on said rod working in said cylindrical casing; a valve on the said rod or stem arranged to close the discharge-opening of said spout; and a spring acting upon said rod to close said valve, substantially as described.

5. In an axle-oiler, the combination with an oil-box having an outlet-opening; a delivery-spout fitting over said outlet-opening without the box, and a cylindrical casing surrounding said outlet-opening within said box; of a rod or stem extending through the said cylindrical casing and through the outlet-opening and said spout; a piston provided with perforations, and a valve arranged to close said perforations, working in said cylindrical casing on said rod; a valve on said rod arranged to close the discharge-opening of said spout; and a spring acting upon said rod to close said valve, substantially as described.

In testimony whereof we affix our signatures in presence of two witnesses.

CHARLES T. CONNOR.
PAUL J. ZIEGLER.
CHARLES J. W. BRELAND.

Witnesses:
JULIUS SKLARZ,
H. W. MONTAGUE.